US006262382B1

(12) United States Patent
Thomas

(10) Patent No.: US 6,262,382 B1
(45) Date of Patent: Jul. 17, 2001

(54) EXTENDED KEYHOLE SLOT

(75) Inventor: Craig A. Thomas, Marysville, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/407,563

(22) Filed: Sep. 28, 1999

(51) Int. Cl.[7] .......... F16F 1/12
(52) U.S. Cl. .......... 200/293; 200/400; 267/173
(58) Field of Search .......... 200/293, 337, 200/400; 267/155, 173, 179, 170

(56) References Cited

U.S. PATENT DOCUMENTS 1,332,618 3/1920 Durham .
1,396,000 11/1921 Coble .
1,534,515 4/1925 Getchell .......... 200/337 X
2,060,523 11/1936 Packer .
2,936,146 5/1960 Wunder .
3,095,489 * 6/1963 Baird .......... 200/400
3,248,489 4/1966 Korrell et al. .
3,652,049 3/1972 McCown .
3,710,096 1/1973 McFarlin .
4,034,170 7/1977 Raabe et al. .......... 200/337 X
4,133,509 1/1979 Kalbow et al. .
4,190,221 2/1980 Updike .
4,656,880 4/1987 Hildebrand et al. .
5,024,409 6/1991 Bohnen .
5,105,673 * 4/1992 Shibata .......... 267/155 X
5,186,197 2/1993 Lavine .
5,398,565 3/1995 Brock .

* cited by examiner

*Primary Examiner*—Renee Luebke

(57) ABSTRACT

An improved switch mechanism having a housing formed to provide a Z-shaped slot to facilitate the assembly of the spring arm components into the housing.

11 Claims, 3 Drawing Sheets

EXTENDED KEYHOLE SLOT

FIELD OF THE INVENTION

The present invention relates to switch mechanisms and, more particularly, to an improved switch mechanism apparatus and a method for assembly of switch mechanisms.

BACKGROUND OF THE INVENTION

Typical conventional switch mechanisms, as shown for example in FIGS. 1 and 2, are comprised of a mechanism housing 22, a link 12, switch rotor 26, a rotor socket 28 into which the switch rotor is attached, a driver cam 24, a spring cam 16, and spring arm components which include a spring guide 14, spring retainer 18, and spring 20 (not shown). The spring retainer 18 is retained in a slot in the housing by inserting and positioning a spring retainer pin 19 extending from the retainer and having a button end head and a reduced diameter shank (not shown).

The spring arm components of the prior art switch mechanism assembly were assembled to the mechanism housing while the spring is maintained in a compressed position. Maintaining the spring in compression on the spring guide while at the same time positioning the button of the spring retainer into the slot in the housing is a difficulty which complicates the assembly of the device.

More specifically, the spring which is positioned on the spring guide must be maintained in such a position so as to keep it in compression while the spring guide and spring retainer are positioned so that the button of the spring retainer can be inserted into a slot in the housing where the spring arm components will ultimately be secured into an operable switch position.

Not only does maintaining the spring in compression on the spring guide make it difficult to get the button of the spring retainer into the slot in the housing, such a structure typically necessitates the use of a spring compression pin. This necessitates the extra steps of installing the pin and then after assembly of the spring retainer pin into the housing slot, removing the spring compression. The installation of the spring compression pin oftentimes requires off-loading the compression spring on the spring guide from the switch assembly line and subsequently returning it to the assembly line for incorporation into the switch mechanism. This slows down the manufacturing time of the switch as well as increases the probability/possibility of failure or of defective/improper assembly.

It would therefore be an advantage over the prior art devices to provide an arrangement and configuration which overcomes the above-stated disadvantages and which accomplishes the foregoing objective by providing a novel, simple, inexpensive and reliable combination of components which facilitate the assembly of the spring arm components into the switch mechanism housing.

SUMMARY OF THE INVENTION

In accordance with the present invention, an improved switch mechanism is provided comprising: a link, a switch rotor, a rotor socket into which the switch rotor is attached, a drive cam, a spring cam, spring arm components including a spring guide having a spring guide pin including a reduced diameter shank and at one end a button end head, and a spring retainer having a spring retainer pin including a reduced diameter shank and a button end head and a spring; where a mechanism housing is formed to provide a Z-shaped slot having an enlarged keyhole opening for receiving the button end head of the spring retainer pin and for engaging in sliding relationship in the Z-shaped slot, the Z-shaped slot comprising a laterally extending portion in communication with a transversely extending portion which is in communication with a second laterally extending portion where laterally extending slot portion and second laterally extending slot portion extend angularly from transversely extending portion and in opposite directions from one another.

In accordance with another embodiment, a method for installing spring arm components of a switch mechanism into the housing of a switch mechanism is provided where the switch mechanism includes a switch rotor; a rotor socket into which the switch rotor is attached; a drive cam; a spring cam having a slot for receiving a button end head of a spring guide; the spring arm components including a spring guide having a spring guide pin including at one end a button end head and a reduced diameter shank; a spring retainer having a spring retainer pin including a button end head and a reduced diameter shank; a spring; and wherein the mechanism housing is formed to provide a Z-shaped slot having an enlarged opening for receiving the button end head of spring retainer pin and for engaging the reduced diameter shaft in sliding relationship in the Z-shaped slot, the Z-shaped slot comprising a laterally extending portion in communication with a transversely extending portion in communication with a second laterally extending portion where laterally extending slot portion and second laterally extending slot portion extend angularly from transversely extending portion and in opposite directions from one another; comprising the steps of: (a) assembling the spring arm components comprising a spring guide having a button end head, a spring retainer having a button end head, and a spring; (b) positioning the assembled spring arm components and inserting the button end head of the spring guide into the spring cam slot; (c) rotating the assembled spring arm components for insertion of the button end head of spring retainer into the enlarged opening of the Z-shaped slot; (d) sliding the button end head of the spring retainer through the enlarged opening into the laterally extending slot portion and then into transversely extending slot portion and then into second laterally extending slot portion.

DETAILED DESCRIPTION OF THE INVENTION

Figure 1:
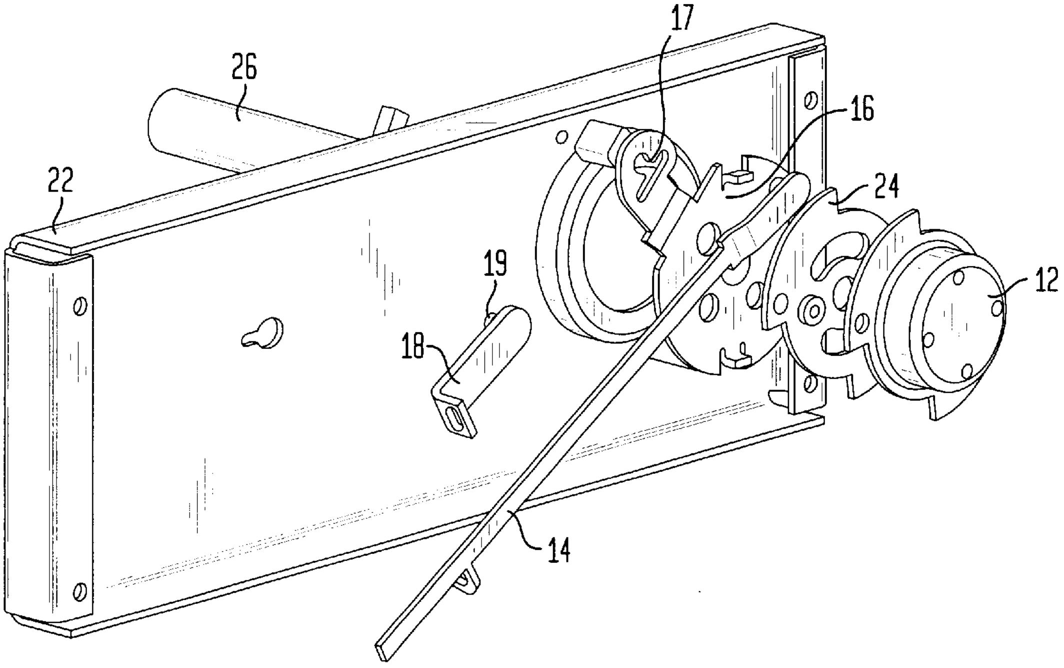
FIGS. 1 and 2 show a typical switch mechanism in exploded perspective views.
Figure 2:
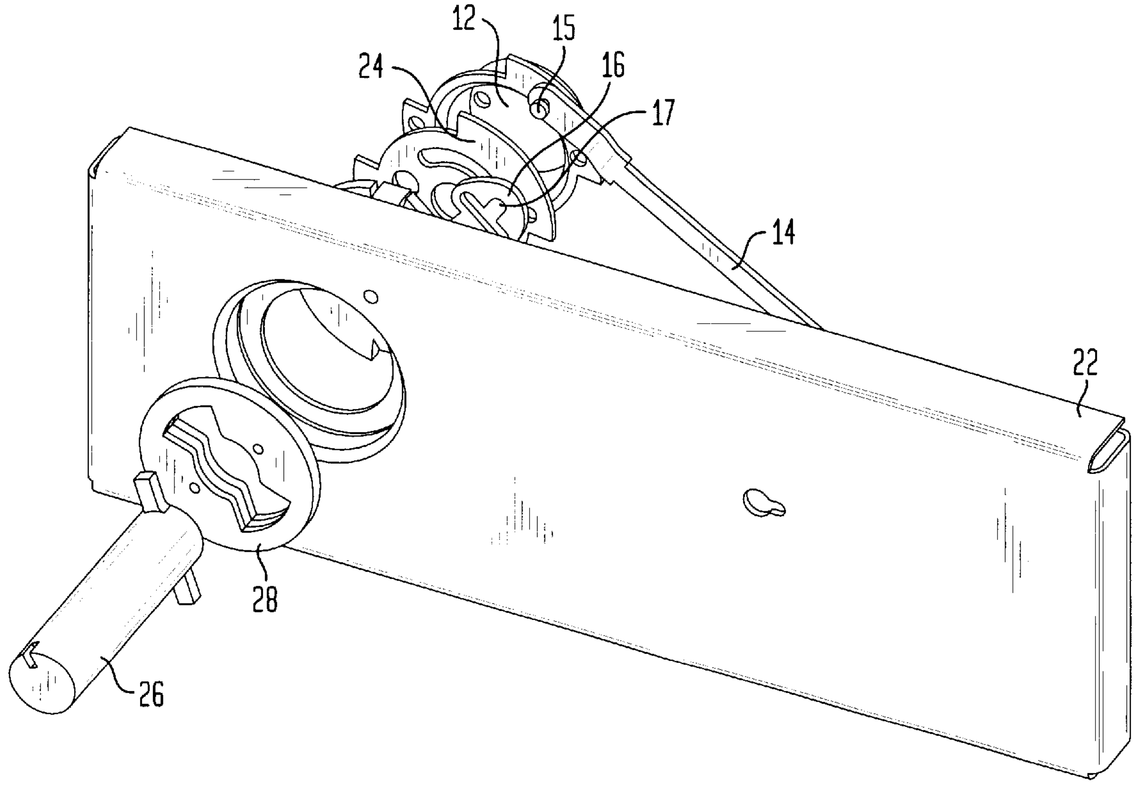
Figure 3:
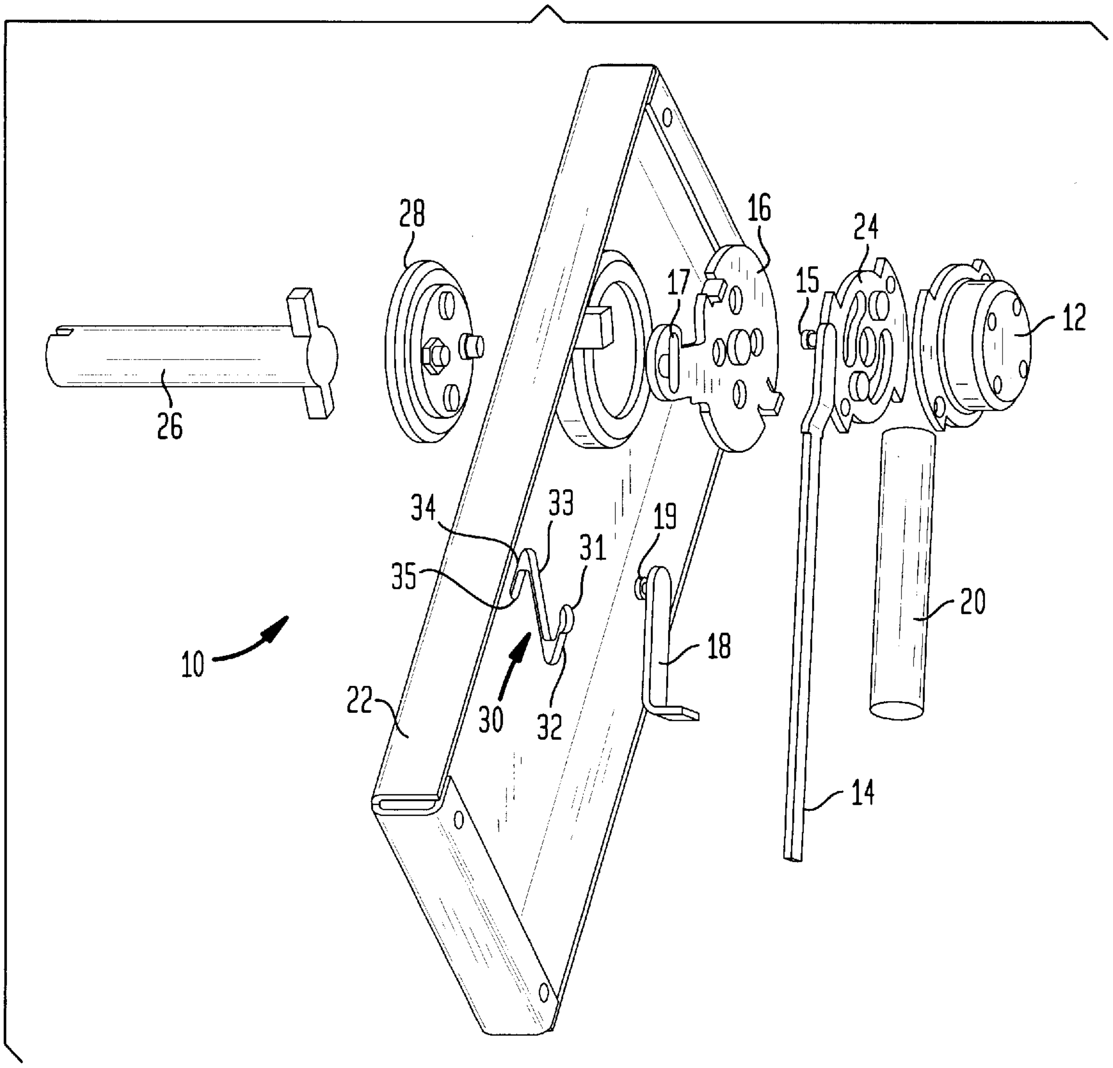
FIGS. 3 and 4 show a switch mechanism in accordance with the present invention in an exploded perspective view and an assembled switch in perspective view.
Figure 5:
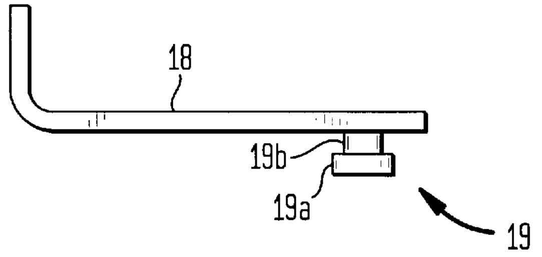
FIG. 5 is an isolated view of the spring retainer shown in FIGS. 3–4.
Figure 7:
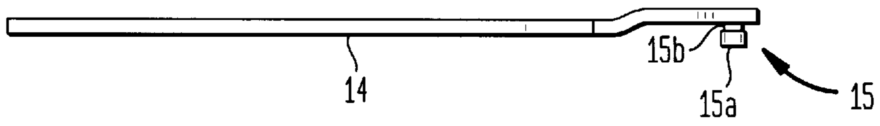
FIG. 7 is a side view of the spring guide shown in FIGS. 3 and 4.
Figure 4:
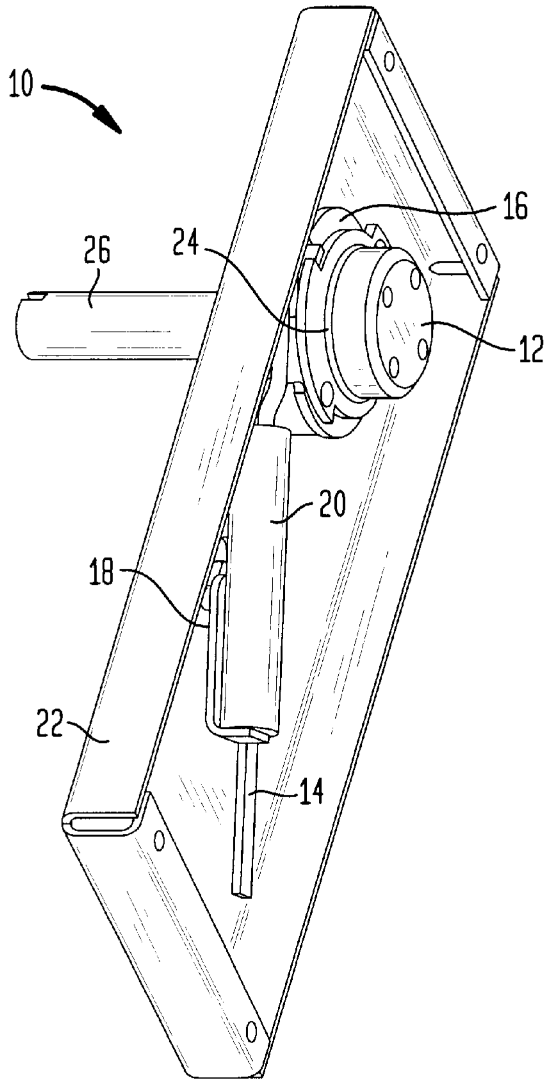
Figure 6:
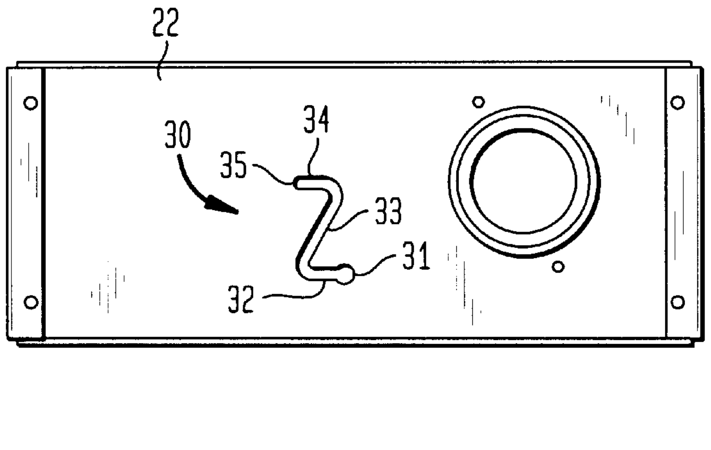
FIG. 6 is a side view of the mechanism housing showing the Z-shaped slot.

Referring to FIGS. 3 and 4 which show perspective views of the switch mechanism 10 comprising a mechanism housing 22, a link 12, a switch rotor 26, a rotor socket 28 into which the switch rotor 26 is attached, a driver cam 24, a spring cam 16 having a spring cam slot 17, and spring arm components which include spring guide 14, spring retainer 18 and spring 20. Spring guide 14 has a spring guide pin 15 with a button end head 15*a* and a reduced diameter shank 15*b* (FIG. 7). Spring retainer 18 has a spring retainer pin 19 with a button end head 19*a* and reduced diameter shank 19*b* (FIG. 5). Mechanism housing 22 is formed to provide a "Z-shaped" slot 30. Z-shaped slot 30 includes an enlarged opening 31 forming a keyhole shaped end through which the button end head 19*a* of spring retainer pin 19 may be inserted (FIG. 6). The length of spring retainer pin 19 and the diameter of reduced diameter shank 19*b* as well as the diameter of end head 19*a* are such that spring retainer pin 19 projects into Z-shaped slot 30 and the end head 19*a* of spring retainer pin 19 passes through the enlarged opening 31 of Z-shaped slot for an engaged sliding relationship. Spring retainer pin 19 is adapted to slide in Z-shaped slot 30 from enlarged opening 31 into laterally extending slot portion 32 and into transversely extending slot portion 33 and into second laterally extending slot portion 34. Laterally extending slot portion 32 and second laterally extending slot portion 34 extend angularly from transversely extending slot portion 33 and in opposite directions from one another.

In accordance with the present invention, a combination of arranged components and slots facilitate the easy assembly of spring arm components together and into the switch mechanism housing.

In accordance with the present invention, the spring arm components comprising spring guide 14, spring retainer 18 and spring 20 are assembled and placed into mechanism housing 22 without being under spring tension. The pre-assembled spring arm components comprising spring 20, spring guide 14 and spring retainer 18 are positioned so that the button head 15*a* of the spring guide 14 is inserted into slot 17 in the spring cam 16 which has previously been assembled with driver cam 24 and rotor socket 28 in the mechanism housing 22. In this position, spring 20 is not in compression in either the assembled or separated position in the switch mechanism 10. Thereafter, the pre-assembled spring 20, spring retainer 18 and spring guide 14 is rotated as a unit and positioned so that the button end head 19*a* of the spring retainer 18 is aligned with and inserted into the enlarged opening 31 of Z-shaped slot 30 in a first secured non-operating position. The pre-assembled spring, spring retainer and spring guide is then moved by sliding the button end bead 19*a* of the spring retainer 18 into laterally extending slot portion 32, into transversely extending slot portion 33, into second laterally extending slot portion 34 and finally against ending edge 35 of second laterally extending slot portion 34 in its final secured and operating position.

Movement of the assembled spring components from it's first secured non-operating position in enlarged opening 31 to its final secured and operating position against ending edge 35 is accomplished by sliding the button end head 19*a* of the spring retainer 18 in Z-shaped slot 30 depicted in FIGS. 3 and 4. During this movement, the spring is brought into compression, but since it already is part of the pre-assembled spring arm components and secured in the mechanism housing, the assembly of the switch, and more particularly the incorporation of the spring arm components into the switch, is facilitated.

Although the invention has been described in particular by the use of a Z-shaped slot, it will be understood by those skilled in the art that this slot which has a first secured non-operating position and a final secured operating position can be of shapes other than Z-shaped it being understood from the above described embodiment that the first secured non-operating position of the slot does not fully compress the spring and that the final secured operating position fixes the spring components for operation in the switch mechanism.

While the foregoing description and drawings represent the preferred embodiments of the present invention, it will be apparent to those skilled in the art that various changes and modifications may be made therein without departing from the true spirit and scope of the present invention.

What is claimed:

1. An improved switch mechanism comprising:

a link;

a drive cam coupled to the link;

a spring cam coupled to the drive cam;

a rotor socket coupled to the spring cam;

a switch rotor received in the rotor socket;

a spring guide pivotally coupled to the spring cam having a spring guide pin including a reduced diameter shank and at one end a button end head;

a spring retainer having a spring retainer pin including a reduced diameter shank and a button end head;

a spring journaled on the spring guide; and a mechanism housing formed to provide a Z-shaped slot having a keyhole opening configured to receive the button end head of the spring retainer pin and for engaging the reduced diameter shank of the spring guide pin in sliding relationship in the Z-shaped slot, the Z-shaped slot comprising a laterally extending portion in communication with a transversely extending portion which is in communication with a second laterally extending portion where the laterally extending slot portion and the second laterally extending slot portion extend angularly from the transversely extending portion and in opposite directions from one another.

2. A method for installing spring arm components of a switch mechanism into the housing of a switch mechanism comprising of a switch rotor; a rotor socket into which the switch rotor is attached; a drive cam; a spring cam having a slot for receiving a button end head of a spring guide; the spring arm components including a spring guide having a spring guide pin including at one end a button end head and a reduced diameter shank; a spring retainer having a spring retainer pin including a button end head and a reduced diameter shank; a spring; and wherein the mechanism housing is formed to provide a Z-shaped slot having an opening for receiving the button end head of the spring retainer pin and for engaging the reduced diameter shaft in sliding relationship in the Z-shaped slot, the Z-shaped slot comprising a laterally extending portion in communication with a transversely extending portion in communication with a second laterally extending portion where the laterally extending slot portion and the second laterally extending slot portion extend angularly from the transversely extending portion and in opposite directions from one another; comprising the steps of:

(a) assembling the spring arm components comprising the spring guide having the button end head, the spring retainer having the button end head, and the spring;

(b) positioning the assembled spring arm components and inserting the button end head of the spring guide into the spring cam slot;

(c) rotating the assembled spring arm components for insertion of the button end head of spring retainer into the enlarged opening of the Z-shaped slot;

(d) sliding the button end head of the spring retainer through the enlarged opening into the laterally extending slot portion and then into the transversely extending slot portion and then into the second laterally extending slot portion.

3. A switch mechanism housing, comprising:

a substantially planar member;

a spring;

a spring retainer;

a Z-shaped slot defining first and second positions formed in the planar member, the slot configured to receive the spring retainer, the spring retainer coacting with the spring;

wherein the spring retainer may be moved in the slot from the first position to the second position to compress the spring.

4. The switch mechanism housing of claim 3, wherein the spring is not fully compressed when the spring retainer is in the first position.

5. The switch mechanism housing of claim 3, further comprising:

an aperture in the planar member;

a rotatable member extending through the aperture;

a spring guide attached to the member;

wherein the spring retainer has an opening through which the spring guide passes such that the spring retainer is movable with respect to the spring guide.

6. The switch mechanism housing of claim 3, wherein the slot has a laterally extending portion in communication with a transversely extending portion in communication with a second laterally extending portion where the laterally extending slot portion and the second laterally extending slot portion extend angularly from the transversely extending portion and in opposite directions from one another.

7. The switch mechanism housing of claim 3, wherein the spring has a first end and a second end, the first end retained by the spring retainer, and the second end retained by a spring guide.

8. The switch mechanism housing of claim 7, wherein the spring guide is coupled to a switch mechanism.

9. A method of assembling a switch, comprising the steps of:

providing a switch mechanism having a spring guide, and a spring journaled on the spring guide;

providing a switch mechanism housing having a Z-shaped slot with a first end and a second end;

providing a means for retaining the spring on the spring guide, the means configured to be received in and slide within the slot;

inserting the retaining means into the first end of the slot while the spring is uncompressed; and sliding the retaining means to the second end of the slot, whereby the spring is thereby compressed.

10. The method of claim 9 wherein the retaining means is a spring retainer.

11. The method of claim 9 wherein the slot has a laterally extending portion in communication with a transversely extending portion in communication with a second laterally extending portion where the laterally extending slot portion and the second laterally extending slot portion extend angularly from the transversely extending portion and in opposite directions from one another.

* * * * *